(12) United States Patent
Tsuyunashi et al.

(10) Patent No.: US 11,323,518 B2
(45) Date of Patent: May 3, 2022

(54) DATA COLLECTION DEVICE, DATA COLLECTION SYSTEM, VEHICLE DEVICE, AND DATA COLLECTION METHOD

(71) Applicants: DENSO TEN Limited, Kobe (JP); TOYOTA JIDOSHA KABUSHIKI KAISHA, Toyota (JP)

(72) Inventors: Masashi Tsuyunashi, Kobe (JP); Yasuyuki Kusumoto, Nagoya (JP)

(73) Assignees: DENSO TEN Limited, Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/015,541

(22) Filed: Sep. 9, 2020

(65) Prior Publication Data

US 2021/0105325 A1    Apr. 8, 2021

(30) Foreign Application Priority Data

Oct. 2, 2019 (JP) .............................. JP2019-182079

(51) Int. Cl.
*H04L 67/12* (2022.01)
*G06F 16/29* (2019.01)
*H04W 4/029* (2018.01)
*H04W 4/44* (2018.01)

(52) U.S. Cl.
CPC .............. *H04L 67/12* (2013.01); *G06F 16/29* (2019.01); *H04W 4/029* (2018.02); *H04W 4/44* (2018.02)

(58) Field of Classification Search
None
See application file for complete search history.

(56) References Cited

U.S. PATENT DOCUMENTS

2004/0207541 A1* 10/2004 Choi ...................... G01C 21/32
340/995.12
2008/0091339 A1   4/2008 Nagase et al.
(Continued)

FOREIGN PATENT DOCUMENTS

JP    2002-318118 A    10/2002
JP    2003-122656 A    4/2003
(Continued)

OTHER PUBLICATIONS

Jan. 12, 2021 Office Action issued in Japanese Patent Application No. 2019-182079.
(Continued)

*Primary Examiner* — Lance Leonard Barry
*Assistant Examiner* — Mohammad Yousuf A. Mian
(74) *Attorney, Agent, or Firm* — Oliff PLC

(57) ABSTRACT

A data collection device includes: an acquirer configured to acquire the location of a vehicle from a vehicle device mounted on the vehicle; an extractor configured to extract, based on the location of the vehicle, at least one identifier out of identifiers each assigned to a region on a map that is divided into a plurality of regions; a distributor configured to distribute to the vehicle device at least one information pair that is formed by pairing the extracted identifier with a data collection condition; and a collector configured to collect, from the vehicle device, data gathered by the vehicle device based on the collection condition.

8 Claims, 7 Drawing Sheets

(56) References Cited

U.S. PATENT DOCUMENTS

| | | | | |
|---|---|---|---|---|
| 2009/0018832 A1* | 1/2009 | Mukaigaito | ............ | G10L 15/26 704/251 |
| 2017/0336216 A1* | 11/2017 | Tanizaki | ................ | G09B 29/00 |
| 2018/0374364 A1* | 12/2018 | Kennedy | ................. | G06F 11/32 |
| 2020/0072621 A1* | 3/2020 | Lee | .................... | G01C 21/3889 |

FOREIGN PATENT DOCUMENTS

| | | |
|---|---|---|
| JP | 2004-325430 A | 11/2004 |
| JP | 2006-221537 A | 8/2006 |
| JP | 2008-077143 A | 4/2008 |
| JP | 2008-097345 A | 4/2008 |
| JP | 2014-149784 A | 8/2014 |
| JP | 2018-022398 A | 2/2018 |
| JP | 2018-055191 A | 4/2018 |
| JP | 2018-112838 A | 7/2018 |
| JP | 2018-132689 A | 8/2018 |
| JP | 2019-138747 A | 8/2019 |

OTHER PUBLICATIONS

Jun. 15, 2021 Notice of Reasons for Refusal issued in Japanese Patent Application No. 2019-182079.

\* cited by examiner

FIG.5

| ID 101<br>C-D<br>C01 | ID 102<br>C-D<br>C02 | ID 103<br>C-D<br>C03 |
|---|---|---|
| ID 201<br>C-D<br>C04 | ID 202<br>C-D<br>C05 | ID 203<br>C-D<br>C06 |
| ID 301<br>C-D<br>C07 | ID 302<br>C-D<br>C08 | ID 303<br>C-D<br>C09 |

\* C-D;
COLLECTION CONDITION

FIG.6

| ID 102<br>C-D<br>C02 | ID 103<br>C-D<br>C03 | ID 104<br>C-D<br>C10 |
|---|---|---|
| ID 202<br>C-D<br>C05 | ID 203<br>C-D<br>C06 | ID 204<br>C-D<br>C11 |
| ID 302<br>C-D<br>C08 | ID 303<br>C-D<br>C09 | ID 304<br>C-D<br>C12 |

\* C-D;
COLLECTION CONDITION

* C-D;
COLLECTION CONDITION

DATA COLLECTION DEVICE, DATA COLLECTION SYSTEM, VEHICLE DEVICE, AND DATA COLLECTION METHOD

CROSS-REFERENCES TO RELATED APPLICATIONS

This application is based on Japanese Patent Application No. 2019-182079 filed on Oct. 2, 2019, the contents of which are hereby incorporated by reference.

BACKGROUND OF THE INVENTION

Field of the Invention

This invention relates to a data collection device, a data collection system, a vehicle device, and a data collection method.

Description of Related Art

There is a known technique by which a terminal mounted on a vehicle is instructed to gather data and the gathered data is collected from the terminal. For example, JP-A-2018-112838 discloses a data collection system that includes a vehicle-mounted terminal incorporated in a vehicle and a traveling data collection center. The vehicle-mounted terminal includes a traveling data acquirer which acquires traveling data and a transmitter which transmits the traveling data acquired by the traveling data acquirer. The traveling data collection center includes a receiver which collects traveling data transmitted from the terminals mounted on a plurality of vehicles respectively.

SUMMARY OF THE INVENTION

In the data collection system according to JP-A-2018-112838, a vehicle-mounted terminal includes a non-volatile memory for storing map data, and map matching is performed by the vehicle-mounted terminal. This allows the traveling data collection center to specify roads from which to collect traveling data.

With a configuration that essentially requires a vehicle-mounted terminal to have map data, communication volume between the traveling data collection center and the vehicle-mounted terminal tends to be large. Moreover, the map data on the traveling collection center needs to match the map data on the vehicle-mounted terminal, and thus it is necessary to check occasionally whether they match. This may lead to inconvenience such as increased communication cost.

In view of the inconveniences mentioned above, an object of the present invention is to provide a technology for reducing communication load in a system for collecting data from a vehicle.

To achieve the above object, according to one aspect of the present invention, a data collection device includes: an acquirer configured to acquire the location of a vehicle from a vehicle device mounted on the vehicle; an extractor configured to extract, based on the location of the vehicle, at least one identifier out of the identifiers each assigned to a region on a map that is divided into a plurality of regions; a distributor configured to distribute to the vehicle device at least one information pair that is formed by pairing the extracted identifier with a data collection condition; and a collector configured to collect, from the vehicle device, data gathered by the vehicle device based on the collection condition.

To achieve the above object, according to another aspect of the present invention, a data collection system includes the data collection device according to the above configuration and the vehicle device.

To achieve the above object, according to yet another aspect of the present invention, a vehicle device is one which, in response to commands from a data collection device arranged outside a vehicle, gathers data and transmits the data to the data collection device, and includes: a receiver configured to receive information pairs each formed by pairing an identifier, which is extracted out of identifiers each assigned to a region on a map that is divided into a plurality of regions, with a data collection condition; a calculator configured to calculate the identifier based on information on the location of the vehicle; and a determiner configured to determine whether to gather the data based on the calculated identifier and the information pair.

To achieve the above object, a data collection method according to a further aspect of the present invention includes: acquiring the location of a vehicle from a vehicle device mounted on the vehicle; extracting, based on the location of the vehicle, at least one identifier out of the identifiers each assigned to a region on a map that is divided into a plurality of regions; distributing to the vehicle device at least one information pair that is formed by pairing the extracted identifier with a data collection condition; and collecting, from the vehicle device, data gathered by the vehicle device based on the collection condition.

BRIEF DESCRIPTION OF THE DRAWINGS

FIG. 5 is a diagram illustrating an example of extraction of mesh IDs by an extractor;

FIG. 6 is a diagram showing mesh IDs extracted by the extractor when the region where a vehicle is located has been shifted from that in FIG. 5 to its adjacent region on the right;

DETAILED DESCRIPTION OF PREFERRED EMBODIMENTS

Exemplary embodiments of the present invention will be described in detail below with reference to the accompanying drawings.

1. Data Collection System

Figure 1:
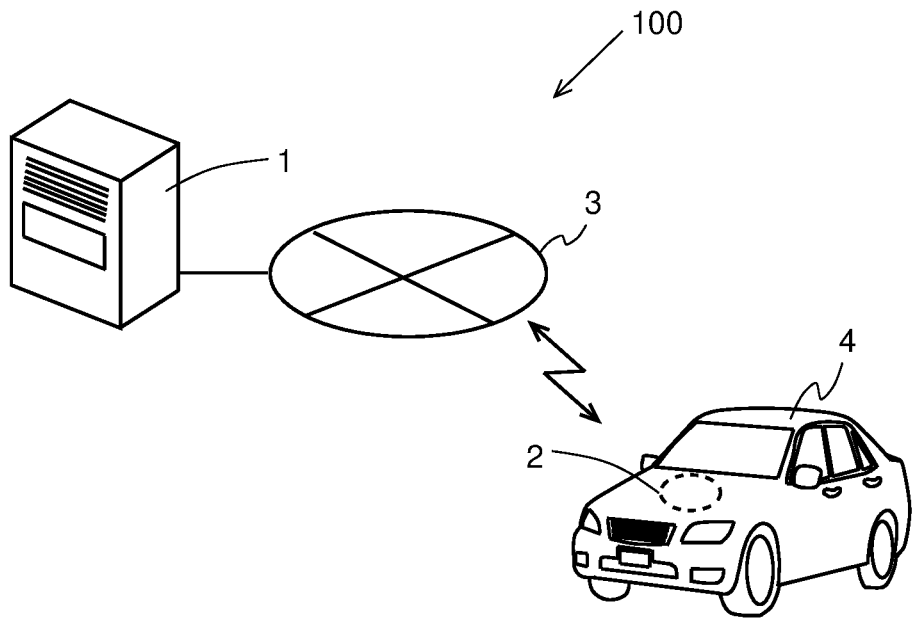
FIG. 1 is a diagram showing a configuration of a data collection system.

FIG. 1 is a diagram showing the configuration of a data collection system 100 according to an embodiment of the present invention. The data collection system 100 includes a data collection device 1 and a vehicle device 2. The data collection device 1 and the vehicle device 2 can communicate with each other via a network 3 such as the Internet or a mobile telephone network. The data collection device 1 sends commands to the vehicle device 2. In response to commands from the data collection device 1, the vehicle device 2 gathers data. The data collection device 1 collects from the vehicle device 2 the data gathered by the vehicle device 2.

The data gathered by the vehicle device 2 (in other words, the data which the data collection device 1 collects) can include, for example, image data around a vehicle captured by a camera mounted on the vehicle 4. The image data can be that of a still image or a moving image. The data gathered by the vehicle device 2 can include, for example, CAN data obtained through a CAN (controller area network) bus provided inside the vehicle 4. The CAN data can include, for example, speed data, braking data, and steering data. The data gathered by the vehicle device 2 can include data obtained from a sensor incorporated in the vehicle, such as a radar sensor, a LIDAR (laser imaging detection and ranging) sensor, or an ultrasonic sensor.

The data collection device 1 is configured as a cloud server that provides a cloud service via the network 3. The data collection device 1 accepts a request for data collection from a data user (unillustrated) and, based on the accepted collection request, provides the data user with the data collected from the vehicle device 2.

The vehicle device 2 is incorporated in the vehicle 4. In this embodiment, the vehicle 4 is an automobile. However, the vehicle 4 can be any other vehicle with wheels such as a motorbike, a railroad train, or an unmanned carrier. FIG. 1 only shows one vehicle device 2 incorporated in the vehicle 4. However, the data collection system 100 generally includes a plurality of vehicle devices 2 that are incorporated in different vehicles 4 respectively. The data collection device 1 gives commands to the vehicle devices 2 incorporated in different vehicle 4 and collects from the respective vehicle devices 2 the data gathered by the respective vehicle devices 2.

The vehicle device 2 can be shared with, for example, a drive recorder or a navigation device. Or the vehicle device 2 can be a device independent from a drive recorder or a navigation device. The vehicle device 2 can be a vehicle-mounted device or a mobile terminal that can be carried around by an occupant of the vehicle 4. If the vehicle device 2 is a mobile terminal, the vehicle device 2 can be, for example, a smartphone or a tablet computer.

2. Data Collection Device

Figure 2:
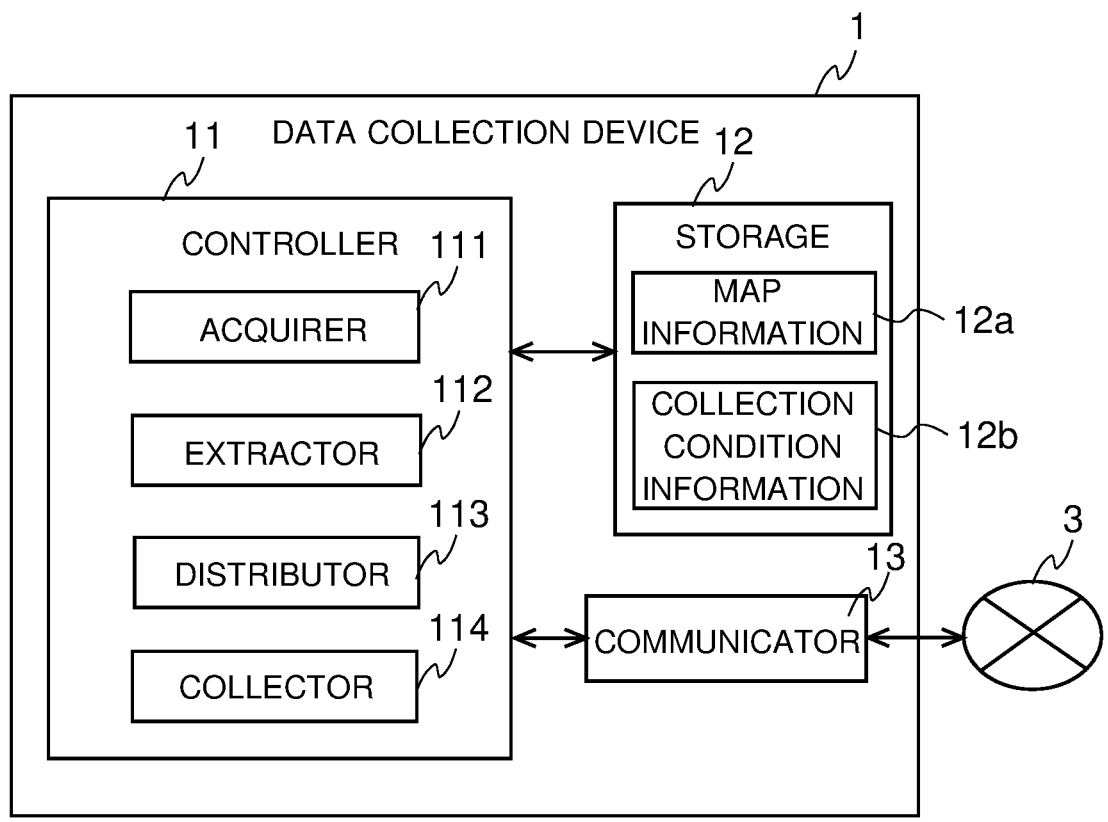
FIG. 2 is a block diagram showing a configuration example of a data collection device.

FIG. 2 is a block diagram showing a configuration example of the data collection device 1 according to the embodiment of the present invention. FIG. 2 only shows components needed to describe the features of the embodiment; no description will be given of common components. As shown in FIG. 2, the data collection device 1 includes a controller 11, a storage 12, and a communicator 13.

The controller 11 is a controller that comprehensively controls the whole data collection device 1. The controller 11 is configured to include a CPU (central processing unit), a RAM (random-access memory), a ROM (read-only memory), and the like. The controller 11 can be configured as an integrated circuit such as an ASIC (application-specific integrated circuit) or an FPGA (field-programmable gate array).

The storage 12 is configured as, for example, a semiconductor memory device such as a RAM or a flash memory, a hard disk, or a portable recording medium such as an optical disc. The storage 12 stores programs as firmware as well as various kinds of data. In this embodiment, the storage 12 stores map information 12a and collection condition information 12b.

The map information 12a is a database that stores map data including, for example, node data and link data. The map information 12a can include information on identifiers each assigned to a region on a map that is divided into a plurality of regions. More specifically, identifiers are each assigned to a region on a map that is divided into a lattice based on latitude and longitude. An identifier is, for example, a number. Hereinafter, an identifier will occasionally be referred to as a mesh ID.

In this embodiment, a configuration is adopted where identifiers are each assigned to a region on a map that is divided into a lattice. However, this is merely an example. Identifiers can each be assigned to a region on a map that is divided into any other shape, such as, for example, hexagons. Identifiers can each be assigned to a country, state, prefecture, or municipality on a map.

The collection condition information 12b is a database in which a plurality of collection conditions are accumulated. A collection condition is a condition that is set to make the vehicle device 2 collect data, and is specified by, for example, a data user who uses the data collection device 1. Collection conditions can include, for example, a data collection area, a data collection start time, and a collection target. The collection area is specified with, for example, a mesh ID. The data collection start time is, for example, when a vehicle meets a predetermined speed condition, when a predetermined time comes, and when a predetermined image is recognized. The collection target is, for example, an image in a specific direction, the speed of a vehicle, or the number of times of braking. For example, in an area in which traffic jams frequently occur, the collection target is a frontward image so as to permit recognition of the condition of congestion. Or, for example, in an area where accidents frequently occur, the collection target is the number of times of braking so as to permit analysis of the reason why accidents frequently occur.

The communicator 13 is configures as, for example, an NIC (network interface card) or the like. The communicator 13 is connected to the network 3 on a wired or wireless basis and performs transmission/reception of information between the vehicle device 2 via the network 3.

An acquirer 111, an extractor 112, a distributor 113, and a collector 114 shown in FIG. 2 are the functions of the controller 11 which are performed as a result of the CPU in the controller 11 performing arithmetic operations in accordance with the programs stored in the storage 12. That is, the data collection device 1 includes the acquirer 111, the extractor 112, the distributor 113, and the collector 114.

In the controller 11, at least one of the acquirer 111, the extractor 112, the distributor 113, and the collector 114 can be configured as hardware such as an ASIC or an FPGA. The acquirer 111, the extractor 112, the distributor 113, and the collector 114 are conceptual components. The functions performed by one component can be distributed among a plurality of components, or the functions of a plurality of components can be integrated in one component.

The acquirer 111 acquires the location of a vehicle 4 from the vehicle device 2 mounted on the vehicle 4. More specifically, the acquirer 111 regularly acquires the location of the vehicle 4 from the vehicle device 2 via the network 3 and the communicator 13. The acquirer 111 acquires the location of each vehicle 4, from the vehicle device 2 on the vehicle 4, that is communicably connected to the data collection device 1 via the network 3.

The extractor 112 extracts, based on the location of the vehicle 4, at least one identifier out of the identifiers (mesh IDs in this embodiment) each assigned to a region on a map that is divided into a plurality of regions. Here, the location of the vehicle 4 is that acquired by the acquirer 111. It is preferable that a plurality of mesh IDs be extracted by the extractor 112. In this embodiment, a plurality of mesh IDs are extracted by the extractor 112.

More specifically, the extractor 112 extracts the identifier (mesh ID) of the region where the vehicle 4 is located and the identifiers (mesh IDs) of a plurality of regions adjacent to the region where the vehicle 4 is located. In this way, it is possible to prepare not only the mesh ID of the region where the vehicle 4 is currently located but also the mesh IDs of the regions in a plurality of directions in which the vehicle 4 may move from now. It is thus possible to prevent a data loss during data collection. It is preferable that the extractor 112 extract the mesh IDs of all the regions adjacent to the region where the vehicle 4 is located. In this way, it is possible to prepare the mesh IDs of the regions in all the directions in which the vehicle 4 may move from now.

The extractor 112 calculates the mesh ID of the region where the vehicle 4 is currently located from, for example, the latitude and the longitude of the vehicle 4 that are obtained from the vehicle device 2. When the map information 12a includes information on mesh IDs, the extractor 112 can calculate the mesh ID with reference to the map information 12a. In this embodiment, the extractor 112 extracts the mesh ID of a rectangular region where the vehicle 4 is located and the mesh IDs of all the regions (eight regions) adjacent to the rectangular region where the vehicle 4 is located. The extractor 112 extracts a total of nine mesh IDs. A detailed example of extraction of a mesh ID will be given later.

The distributor 113 distributes to the vehicle device 2 at least one information pair that is formed by pairing an extracted identifier (mesh ID) with a data collection condition. In this embodiment, a plurality of mesh IDs are extracted. The distributor 113 generates an information pair for each extracted mesh ID by attaching a collection condition to it. That is, the distributor 113 distributes a plurality of information pairs to the vehicle device 2. The vehicle device 2 to which information pairs are distributed is the one mounted on the vehicle 4 from which location information for extracting mesh IDs has been previously acquired. The distributor 113, based on the extracted mesh IDs and the collection condition information 12b stored in the storage 12, generates information pairs and distributes them to the vehicle device 2 via the communicator 13.

There can be a mesh ID for which no collection condition can be acquired from the collection condition information 12b. In this case, it is possible to distribute to the vehicle device 2 an information pair with an empty collection condition attached to the mesh ID (substantially the mesh ID alone). In the present description, even information that includes an empty collection condition and that thus includes substantially a mesh ID alone is taken as an information pair. Each mesh ID can be attached with not necessarily a single collection condition but a plurality of collection conditions. Different mesh IDs can be attached with collection conditions different from each other, or some different mesh IDs can be attached with the same collection condition.

The collector 114 collects from the vehicle device 2 data gathered by the vehicle device 2 based on collection conditions. More specifically, the collector 114 collects data from the vehicle device 2 via the network 3 and the communicator 13. The collector 114, based on the collected data and the map information 12a stored in the storage 12, organizes the data as road-by-road collected data using known map matching processing, and stores the organized results in the storage 12. Data stored in the storage 12 is provided to, for example, a data user.

In this embodiment, it is possible to specify an area in which to collect data using a mesh ID (identifier). In this way, it is possible to reduce communication volume between the data collection device 1 and the vehicle device 2 compared to a case where an area for data collection is specified with a map. Moreover, since an area for data collection can be specified using a mesh ID, the vehicle device 2 can be configured to have no map data. This helps reduce the cost of the vehicle device 2. This also saves the trouble of checking whether map data matches between the data collection device 1 and the vehicle device 2. A configuration is also possible where map matching processing is performed not by the vehicle device 2 but by the data collection device 1 alone; thus it is possible to reduce the processing load of the vehicle device 2. With this embodiment, it is possible to reduce the communication load of the data collection system.

3. Vehicle Device

Figure 3:
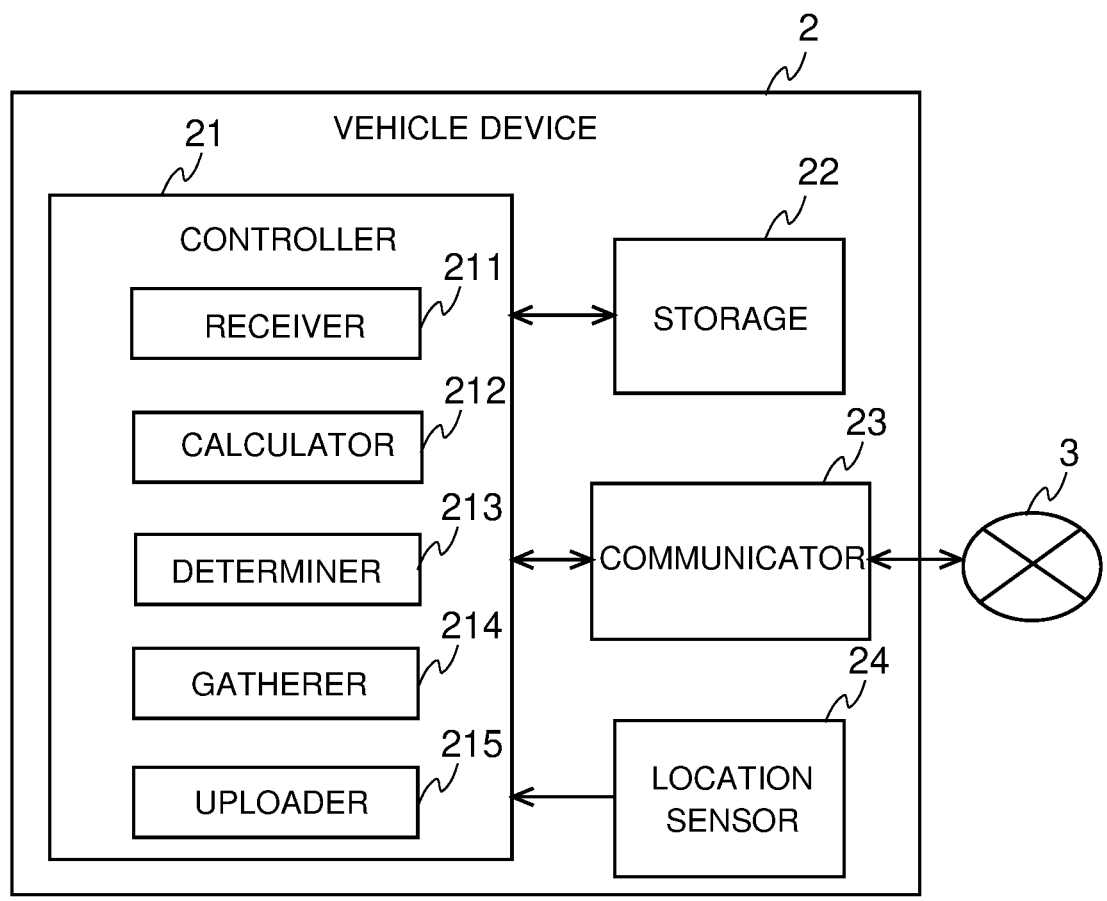
FIG. 3 is a block diagram showing a configuration example of a vehicle device.

The vehicle device 2, in response to commands from the data collection device 1 arranged outside the vehicle 4, gathers data and transmits it to the data collection device 1. FIG. 3 is a block diagram showing a configuration example of the vehicle device 2 according to the embodiment of the present invention. FIG. 3 only shows components needed to describe the features of the embodiment; no illustration or description will be given of common components. As shown in FIG. 3, the vehicle device 2 includes a controller 21, a storage 22, a communicator 23, and a location sensor 24.

The controller 21 is a controller that comprehensively controls the whole vehicle device 2. The controller 21 is configured to include, for example, a CPU, a RAM, and a ROM. The controller 21 can be configured as an integrated circuit such as an ASIC or an FPGA.

The storage 22 is configured as, for example, a semiconductor memory device such as a RAM or a flash memory, a hard disk, a storage device that uses a portable recording medium such as an optical disc, or the like. The storage 22 stores programs as firmware as well as various kinds of data. In this embodiment, the storage 22 has no map data. However, the storage 22 may have map data.

The communicator 23 is configures as, for example, an NIC or the like. The communicator 23 is connected to the network 3 on a wireless basis and performs transmission/reception of information between the data collection device 1 via the network 3.

The location sensor 24 is provided for acquiring information on the location of a vehicle 4. The location sensor 24 is, for example, the GPS (global positioning system) sensor. The location sensor 24 can be an inertial sensor such as a 3D gyro, or can be a combination of a GPS sensor and an inertial sensor. In this embodiment, when the power to the vehicle device 2 mounted on the vehicle 4 is turned on, information on the location of the vehicle 4 acquired by the location sensor 24 is periodically transmitted to the data collection device 1 via the network 3.

A receiver 211, a calculator 212, a determiner 213, a gatherer 214, and an uploader 215 shown in FIG. 3 are the functions of the controller 21 which are performed as a result of the CPU in the controller 21 performing arithmetic operations in accordance with the programs stored in the storage 22. That is, the vehicle device 2 includes the receiver 211, the calculator 212, the determiner 213, the gatherer 214, and the uploader 215.

In the controller 21, at least one of the receiver 211, the calculator 212, the determiner 213, the gatherer 214, and the uploader 215 can be configured as hardware such as an ASIC or an FPGA. The receiver 211, the calculator 212, the determiner 213, the gatherer 214, and the uploader 215 are conceptual components. The functions performed by one component can be distributed among a plurality of components, or the functions of a plurality of components can be integrated in one component.

The receiver 211 receives an information pair distributed by the distributor 113. The receiver 211 receives an information pair from the data collection device 1 via the network 3 and the communicator 23.

The calculator 212 calculates an identifier (mesh ID) based on information on the location of the vehicle 4. Information on the location of the vehicle 4 is acquired by the location sensor 24. The calculator 212 calculates the mesh ID of the region where the vehicle 4 is located based on the latitude and the longitude of the vehicle 4 which are obtained from location sensor 24. The rules of how mesh IDs are assigned are the same as in the data collection device 1.

The determiner 213 determines, based on an identifier (mesh ID) calculated by the calculator 212 and an information pair received by the receiver 211, whether to gather data. More specifically, the determiner 213 compares the calculated mesh ID with the mesh ID included in the received information pair and, based on the result of the comparison, determines whether to gather data.

The gatherer 214 gathers data. More specifically, the gatherer 214, when the determiner 213 determines that data is to be gathered, gathers data in accordance with the collection condition assigned to the mesh ID of the region where the vehicle 4 is located. The gatherer 214 starts gathering data in accordance with the collection condition and finishes gathering data in accordance with the collection condition. The data gathered includes, as described above, for example, image data, speed data, and the number of times of braking.

The uploader 215 uploads the data gathered by the gatherer 214 to the data collection device 1. The uploader 215 can, when data is gathered by the gatherer 214, upload data without inquiring the data collection device 1 whether it needs the data. A configuration is also possible where, when data is gathered by the gatherer 214, the uploader 215 inquires the data collection device 1 whether it needs the data and, only if the data collection device 1 demands the data, uploads the data. This will be described in detail later.

In this embodiment, the vehicle device 2 can, by using a mesh ID, gather data in response to a command from the data collection device 1 even without map data. This helps reduce the cost of the vehicle device 2. This also saves the trouble of checking whether map data matches between the data collection device 1 and the vehicle device 2.

4. Example of Operation of the Data Collection System

Figure 4:
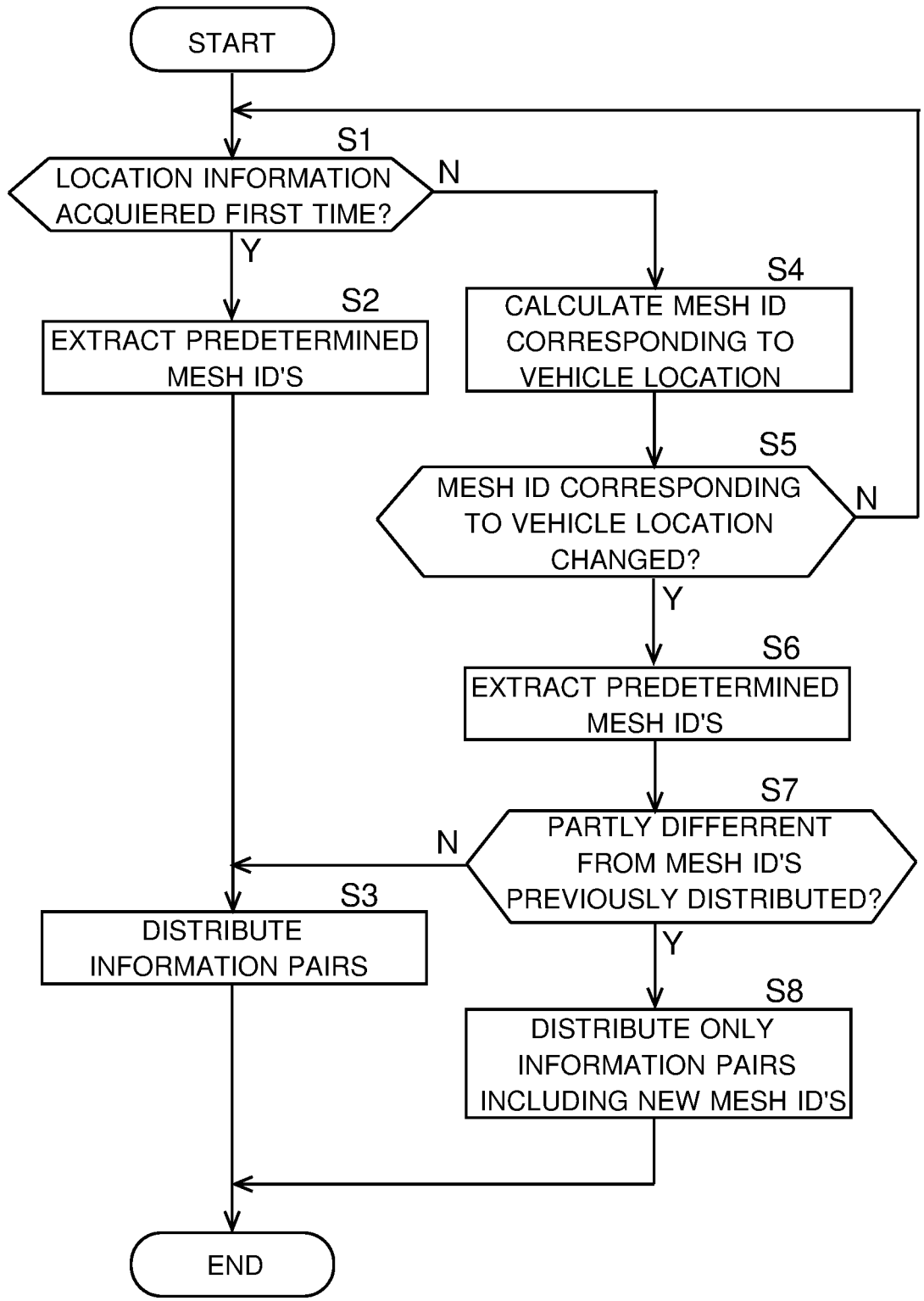
FIG. 4 is a flow chart showing an example of a procedure by which the data collection device gives the vehicle device a command to collect data.

FIG. 4 is a flow chart showing an example of the procedure by which the data collection device 1 gives the vehicle device 2 a command to collect data. The procedure shown in FIG. 4 is performed, for example, every time the acquirer 111 periodically acquires the location of the vehicle 4.

In step S1, the extractor 112 checks whether the information on the location of the vehicle 4 acquired by the acquirer 111 is the location information acquired from the vehicle 4 for the first time. Here, the location information acquired for the first time means the location information that leads the data collection device 1, which has until then not recognized the location of the vehicle 4, to recognize the location of the vehicle 4. Even when the location of the vehicle 4 was recognized in the past, if, thereafter, there was ever a state in which the location of the vehicle 4 was not recognized, the location information that leads the location of the vehicle 4 to be recognized again is taken as the location information acquired for the first time. When the acquired location information is that acquired for the first time (Yes in step S1), the procedure proceeds to step S2. On the other hand, when the acquired location information is not that acquired for the first time (No in step S1), the procedure proceeds to step S4.

In step S2, the extractor 112 extracts predetermined mesh IDs based on the information on the location of the vehicle 4. The extractor 112 calculates the mesh ID of the region where the vehicle 4 is located based on the information on the location of the vehicle 4 and extracts the calculated mesh ID. The extractor 112 also extracts the mesh IDs of all the regions adjacent to the region of the calculated mesh ID. When extraction of a predetermined mesh ID is complete, the procedure proceeds to subsequent step S3.

FIG. 5 is a diagram illustrating an example of extraction of mesh IDs by the extractor 112. FIG. 5 shows nine regions which are adjacent to each other on a map. Each region is assigned a mesh ID. In FIG. 5, the mesh ID of the region where the vehicle 4 is located is "202". The extractor 112 extracts the mesh ID "202" based on information on the location of the vehicle 4. The extractor 112 extracts also the mesh IDs of all the regions adjacent to the region corresponding to the mesh ID "202", namely "101", "102", "103", "201", "203", "301", "302", and "303".

In step S3, the distributor 113 distributes information pairs formed by attaching a collection condition to each extracted mesh ID. In the example shown in FIG. 5, the collection conditions "C01", "C02", "C03", "C04", "C05", "C06", "C07", "C08", and "C09" are respectively attached to the mesh IDs "101", "102", "103", "201", "202", "203", "301", "302", and "303", so that nine information pairs each composed of a mesh ID and a collection condition are distributed to the vehicle device 2. When step S3 is complete, the procedure shown in FIG. 4 ends for now.

In step S4, the extractor 112 calculates the mesh ID corresponding to the location of the vehicle based on information on the location of the vehicle 4. Having calculated the mesh ID corresponding to the location of the vehicle, the extractor 112 advances the procedure to step S5.

In step S5, the extractor 112 compares the mesh ID corresponding to the location of the vehicle calculated in step S4 with the mesh ID corresponding to the location of the vehicle calculated previously to check whether the mesh ID corresponding to the location of the vehicle has been changed. When the mesh ID corresponding to the location of the vehicle has been changed (Yes in step S5), the procedure proceeds to subsequent step S6. On the other hand, when the mesh ID corresponding to the location of the vehicle has not been changed (No in step S5), no transmission of new information pairs is necessary, and thus the procedure returns to step S1.

In step S6, as in step S2, the extractor 112 extracts predetermined mesh IDs. That is, the extractor 112 extracts the mesh ID corresponding to the location of the vehicle and the mesh IDs of all the regions adjacent to the region corresponding to the location of the vehicle.

A description will now be given using examples in FIGS. 5 and 6. FIG. 6 is a diagram showing mesh IDs extracted by the extractor 112 when the region where the vehicle 4 is located has been shifted from that in FIG. 5 to its adjacent region on the right. That is, FIG. 6 shows mesh IDs extracted when the mesh ID that corresponded to the location of the vehicle has been shifted from "202" to "203". In the example in FIG. 6, in step S6, mesh IDs "102", "103", "104", "202", "203", "204", "302", "303", and "304" are extracted.

In step S7, the distributor 113 compares the mesh IDs extracted in step S6 with the mesh IDs previously distributed to the vehicle device 2 to check whether the two groups are partly different. The mesh IDs previously distributed to the vehicle device 2 are those included in the information pairs distributed to the vehicle device 2 previously. When the two groups are partly different (Yes in step S7), the procedure is advanced to step S8. On the other hand, when the two groups are completely different (No in step S7), the procedure is advanced to step S3 mentioned above. That is, an information pair is generated for each of the mesh IDs extracted in step S6, with a collection condition attached to each of them, and all the information pairs are distributed to the vehicle device 2. The examples in FIGS. 5 and 6 correspond to a case where the two groups are partly different.

In step S8, the distributor 113 generates information pairs by attaching a collection condition to each of new mesh IDs that are not included in the mesh IDs distributed previously, and distributes to the vehicle device 2 only the information pairs including the new mesh IDs. When the operation in step S8 is complete, the procedure shown in FIG. 4 ends for now.

To explain taking the examples in FIGS. 5 and 6, the mesh IDs "104", "204", and "304" enclosed by a thick frame in FIG. 6 correspond to the new mesh IDs that are not included in the mesh IDs distributed previously. In step S8, the distributor 113 attaches collection conditions "C10", "C11", and "C12" to the mesh IDs "104", "204", and "304" respectively and distributes only these information pairs to the vehicle device 2.

As explained above, in this embodiment, when the identifiers (mesh IDs) extracted by the extractor 112 are partly different from the identifiers (mesh IDs) extracted previously, the distributor 113 distributes to the vehicle device 2 only the information pairs each composed of a newly extracted identifier (mesh ID) with a collection condition attached to it. This helps reduce communication volume compared to a configuration where all the information pairs are distributed every time so that all the mesh IDs extracted by the extractor 112 are included. However, a configuration may also be adopted where all the information pairs are distributed every time so that all the mesh IDs extracted by the extractor 112 are included.

Figure 7:
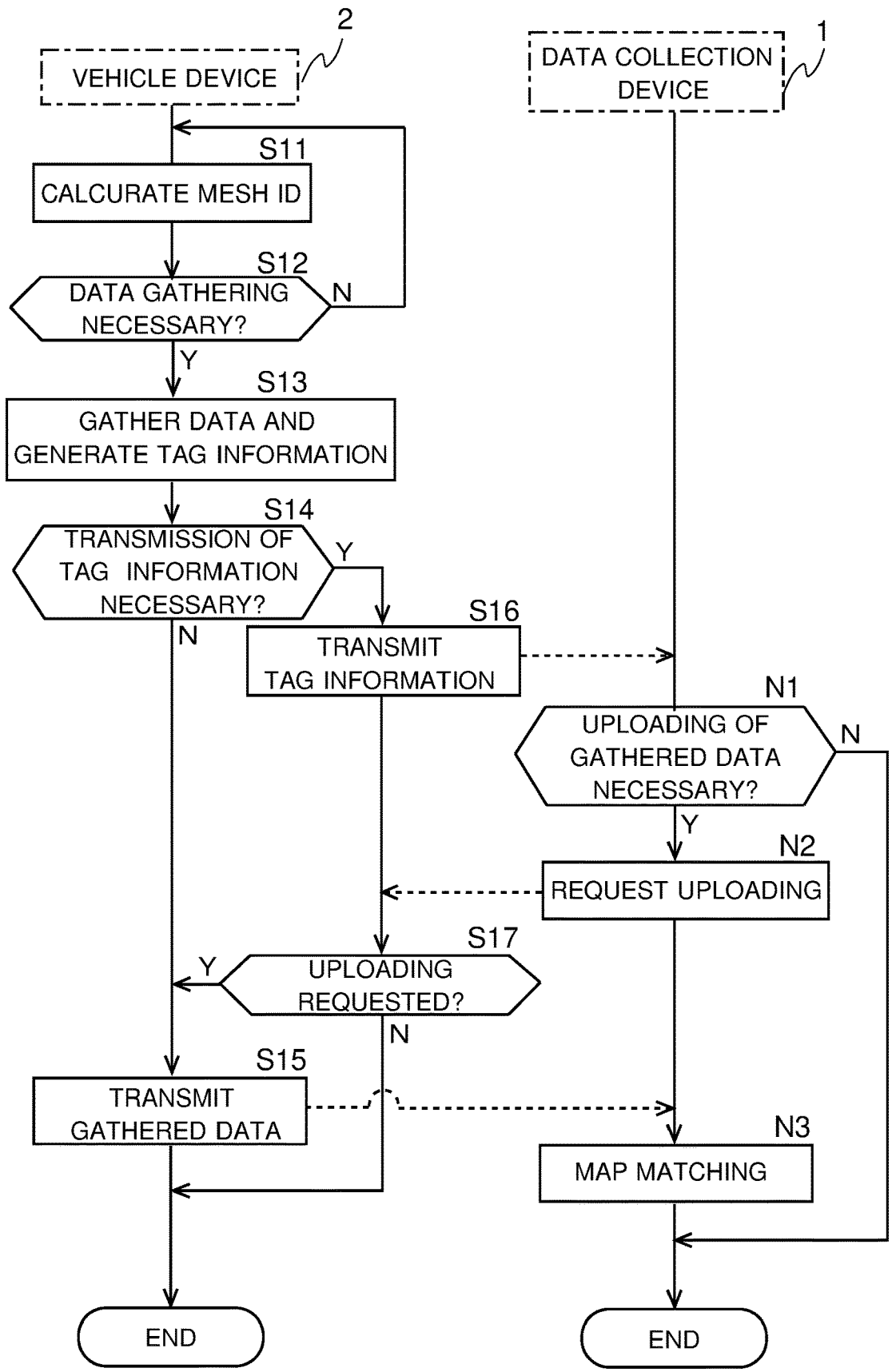
FIG. 7 is a flow chart showing an example of an operation of the vehicle device and the data collection device after the data collection device has given a command to collect data.

Next, a description will be given of the operation of the vehicle device 2 and the data collection device 1 after the data collection device 1 has given a command to collect data. FIG. 7 is a flow chart showing an example of the operation of the vehicle device 2 and the data collection device 1 after the data collection device 1 has given a command to collect data. FIG. 7 is a diagram showing the operation of the vehicle device 2 after information pairs have been received by the receiver 211.

In step S11, the calculator 212 in the vehicle device 2 calculates the mesh ID of the region where the vehicle 4 is located based on information on the current location of the vehicle 4. When the calculation of the mesh ID by the calculator 212 is complete, the procedure proceeds to step S12.

In step S12, the determiner 213 in the vehicle device 2 determines whether gathering of data is necessary. The determiner 213 determines whether, in the mesh IDs included in the information pairs distributed by the data collection device 1, there is any mesh ID that matches a mesh ID calculated by the calculator 212.

When there is a matching mesh ID, except when the collection condition in the information pair that includes the mesh ID is empty, the determiner 213 determines that gathering of data is necessary. When there is no matching mesh ID or when there is a matching mesh ID but the collection condition in the information pair that includes the mesh ID is empty, the determiner 213 determines that no gathering of data is necessary. When it is determined that gathering of data is necessary (Yes in step S12), the procedure proceeds to step S13. When it is determined that no gathering of data is necessary (No in step S12), the procedure returns to step S11.

In step S13, the gatherer 214 gathers data in accordance with the collection condition included in the information pair that includes the same mesh ID as the mesh ID calculated in step S11. In this embodiment, the gatherer 214, while gathering data, generates tag information. The tag information is information that indicates an overview of the data gathered by the gatherer 214 and is associated with the gathered data. Tag information includes, for example, the date and time of data collection, the mesh ID for which data has been collected, the identification number assigned to the vehicle device 2, and the type of data. The type of data can be, for example, image information, speed information, braking information, or the like. When gathering of data and generation of tag information are complete, the procedure proceeds to step S14.

In step S14, it is checked whether the uploader 215 needs to transmit tag information to the date collection device 1. In this embodiment, when tag information needs to be transmitted, the need is included in the collection condition. The uploader 215 can thus determine, by checking the collection condition, whether transmission of tag information is necessary. The uploader 215, when no transmission of tag information is necessary (No in step S14), advances the procedure to step S15. The uploader 215, when transmission of tag information is necessary (Yes in step S14), advances the procedure to step S16.

In step S15, the uploader 215 transmits data gathered by the gatherer 214 to the data collection device 1. The procedure by the vehicle device 2 in the flow chart shown in FIG. 7 thereby ends for now. In the data collection device 1 to which the gathered data has been transmitted, the operation in step N3 is performed.

In step 16, the uploader 215 transmits tag information to the data collection device 1. Having transmitted tag information, the uploader 215 waits for the passage of a predetermined period and then advances the procedure to step S17. During the predetermined period, the data collection device 1 performs the operation in step N1 and, as necessary, the operation in step N2.

In step N1, the collector 114 in the data collection device 1 determines whether uploading of the gathered data is necessary. The collector 114 determines that no uploading of the gathered data is necessary, for example, when similar data has already been collected from a plurality of other vehicles 4. The collector 114 determines whether uploading of data is necessary, for example, depending on the type of the vehicle from which data has been gathered. When the collector 114 determines that uploading of data is necessary (Yes in step N1), the procedure is advanced to step N2. When the collector 114 determines that no uploading of data is necessary (No in step N1), the procedure by the data collection device 1 in the flow chart shown in FIG. 7 ends for now.

In step N2, the collector 114 requests the vehicle device 2 to upload data. After requesting uploading of data, the collector 114 waits for transmission of gathered data from the vehicle device 2 and then performs the operation in step N3.

In step S17, the uploader 215 in the vehicle device 2 checks whether the data collection device 1 has requested uploading of data. When uploading of data has been requested (Yes in step S17), the procedure is advanced to step S15, and data is uploaded. When data is uploaded, the data collection device 1 performs the operation in step N3. When no uploading of data has been requested (No in step S17), no data is uploaded, and the procedure by the vehicle device 2 in the flow chart shown in FIG. 7 ends for now.

In step N3, the collector 114 in the data collection device 1 performs map matching processing based on the gathered data and the map information 12*a* stored in the storage 12. Through this processing, the collected data is organized as road-by-road collected data. When the operation in step N3 is complete, the procedure by the data collection device 1 shown in FIG. 7 ends for now.

In this embodiment, not only the information pair (a mesh ID and a collection condition) of the region where the vehicle 4 is located but, along with it, also the information pairs of a plurality of regions adjacent to the region where the vehicle 4 is located are transmitted to the vehicle device 2. Thus, even when the vehicle 4 is located across regions, it is possible to prevent a data loss during data collection.

In this embodiment, tag information that is associated with data gathered by the vehicle device 2 is generated, and when a command is included in a collection condition, only the tag information is transmitted to the data collection device 1 at first. Then, when the data collection device 1 determines that uploading of the data is necessary based on the tag information, the data is uploaded from the vehicle device 2 to the data collection device 1. In this way, it is possible to prevent unnecessary data from being uploaded to the data collection device 1 and thereby to reduce data communication volume in the data collection system 100. This helps reduce communication cost.

5. Notes

The various technical features disclosed herein can be implemented in any manners other than as described in connection with an embodiment above with various modifications made within the spirit of their technical ingenuity. That is, the embodiments descried above should be understood to be in every aspect illustrative and not restrictive. The technical scope of the present invention is defined not by the description of the embodiments given above but by the appended claims, and should be understood to encompass any modifications made in the sense and scope equivalent to those of the claims. The different embodiments and modified example disclosed herein can be implemented in any possible combination.

In the embodiment described above, the number of mesh IDs extracted by the extractor 112 in the data collection device 1 is constant. However, the extractor 112 can, based on predetermined information acquired by the vehicle device 2, change the number of identifiers (mesh IDs) to be extracted. The predetermined information is information related to the speed of the vehicle 4 on which the vehicle device 2 is mounted. With this, even in a situation where the speed of the vehicle 4 is high and the time required for the vehicle 4 to move from a region to another on a map is shorter than the time required for distributing an information pair (a mesh ID and a collection condition), it is possible to prevent a data loss during data collection.

The predetermined information can be, for example, speed information obtained from a speed sensor on a vehicle 4 on which the vehicle device 2 is mounted. Or, the predetermined information can be the number of times of change of the identifier (mesh ID) corresponding to the location of the vehicle 4 within a predetermined time. A description will be given below of an example, for the latter case, of the procedure by which the number of identifiers to be extracted is changed.

Figure 8:
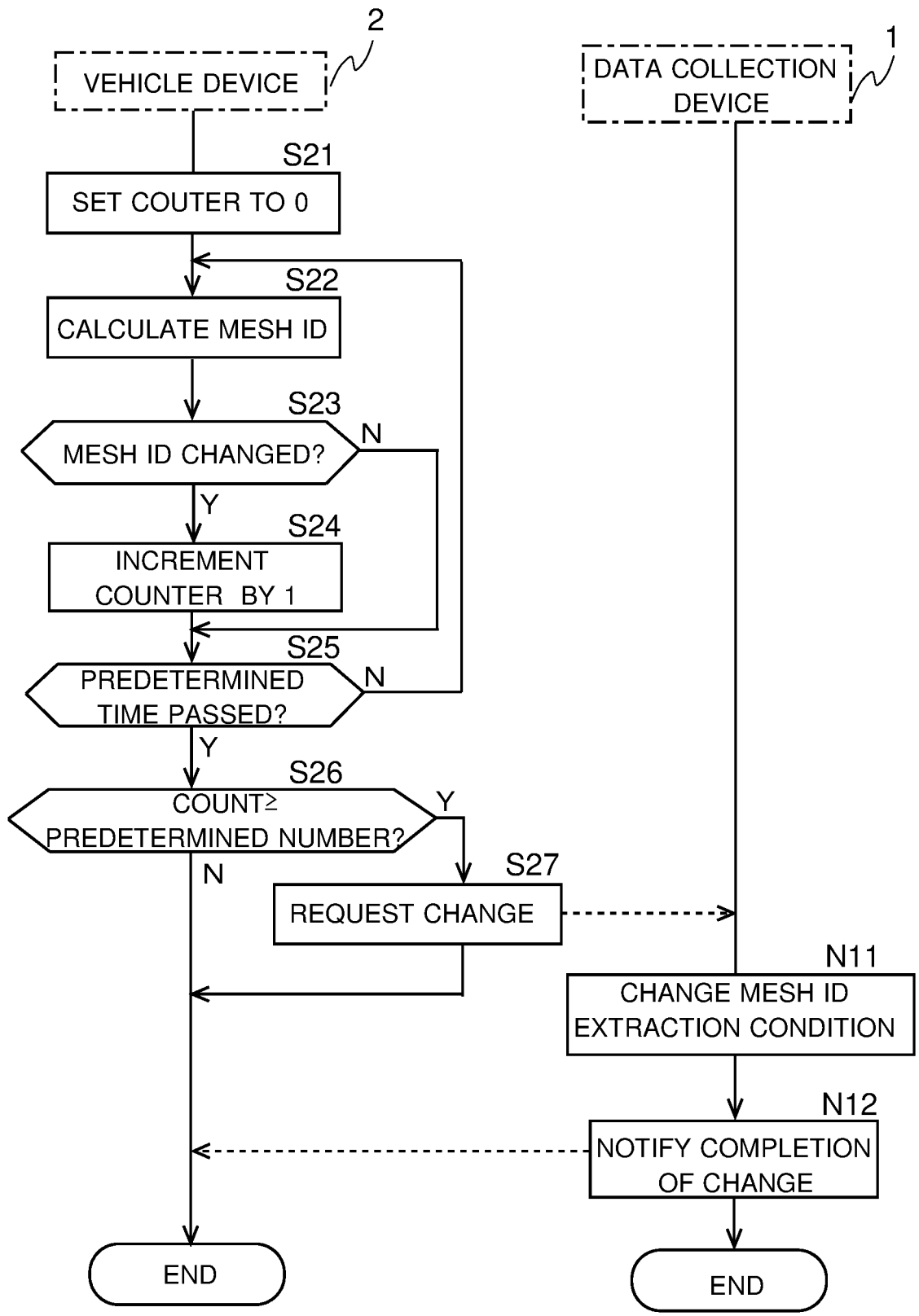
FIG. 8 is a flow chart showing one example of the procedure for changing the number of mesh IDs to be extracted by the extractor.

FIG. 8 is a flow chart showing one example of the procedure for changing the number of mesh IDs to be extracted by the extractor 112. FIG. 8 shows the operation of the data collection device 1 and the operation of the vehicle device 2. The vehicle device 2, for example, periodically performs the operation shown in FIG. 8. The data collection device 1 operates as necessary according to how the vehicle device 2 operates. In the example shown in FIG. 8, the number of mesh IDs to be extracted is, as in the embodiment described above, nine in the initial setting.

In step S21, the controller 21 in the vehicle device 2 sets a counter to zero. When the counter is set to zero, the procedure is advanced to step S22.

In step S22, the controller 21 in the vehicle device 2 calculates, based on information on the current location of the vehicle 4, the mesh ID of the region where the vehicle 4 is located. When the mesh ID is calculated, the procedure is advanced to step S23.

In step S23, the controller 21 in the vehicle device 2 checks whether the calculated mesh ID has been changed from the mesh ID calculated previously. When there has been a change (Yes in step S23), the procedure is advanced to step S24. When there has been no change (No in step S23), the procedure is advanced to step S25.

In step S24, the controller 21 in the vehicle device 2 increments the counter by one. When the counter has been incremented, the procedure is advanced to step S25.

In step S25, the controller 21 in the vehicle device 2 checks whether a predetermined time has passed. When the predetermined time has passed (Yes in step S25), the procedure is advanced to step S26. When the predetermined time has not passed (No in step S25), the procedure returns to step S22.

In step S26, the controller 21 in the vehicle device 2 checks whether the count of the counter has become equal to or more than a predetermined number. When the count is not equal to or more than the predetermined number (No in step S26), it is determined that the speed of the vehicle 4 is not high and thus it is not necessary to change the number of mesh IDs to be extracted; accordingly the flow chart in the vehicle device 2 in FIG. 8 ends for now. On the other hand, when the count is equal to or more than the predetermined number (Yes in step S26), the procedure is advanced to step S27.

In step S27, the controller 21 in the vehicle device 2 requests the data collection device 1 to change the number of mesh IDs to be extracted. In response to the request, the data collection device 1 performs the operation in steps N11 and N12. In the vehicle device 2, when the operation in step S27 is complete, the flow chart shown in FIG. 8 ends for now.

Figure 9:
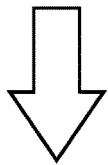
FIG. 9 is a diagram showing one example where the number of mesh IDs to be extracted is increased.

In step N11, the controller 11 in the data collection device 1 changes the condition for extraction of mesh IDs. More specifically, the controller 11 increases the number of mesh IDs to be extracted. FIG. 9 is a diagram showing one example where the number of mesh IDs to be extracted is increased. As shown in FIG. 9, the condition for extraction of mesh IDs is changed such that, for example, the following mesh IDs are extracted: the mesh ID of the region where the vehicle 4 is located ("202"); the mesh IDs of all the regions adjacent to the region where the vehicle 4 is located ("101" to "103", "201", "203", and "301" to "303"); and the mesh IDs of all the 16 regions surrounding those adjacent regions (16 mesh IDs corresponding to the hatched regions). When the condition for extraction of mesh IDs is changed, the procedure is advanced to N12.

In step N12, the controller 11 notifies the vehicle device 2 that the condition for extraction of mesh IDs has been changed. When the operation in step N12 is complete, the procedure by the data collection device 1 in the flow chart shown in FIG. 8 ends for now. Although not shown in FIG. 8, it is preferable that the controller 21 in the vehicle device 2, when no notification of completion of change is delivered from the data collection device 1 within a predetermined period, recognize that the change has not been complete and perform operation such as requesting the change again.

When the number of mesh IDs to be extracted is increased, a collection condition is attached also to each of the additional mesh IDs to generate an information pair. That is, the number of information pairs distributed to the vehicle device 2 increases. Thus, even when the speed of the vehicle 4 is high, it is possible to prevent a data loss during data collection.

Although the above example only shows a case where the number of mesh IDs to be extracted is increased, a configuration is preferable where the number of extraction that has once been increased is reduced back (in the above example, the number is reduced from 25 back to 9) in accordance with the number of times of change of the mesh ID. Although, in the above example, the number of times of change of the mesh ID is compared with one threshold value so that the number of mesh IDs to be extracted is increased by one step, it is also possible to increase the number of threshold values so that the number of mesh IDs to be extracted is increased in a plurality of steps.

4. Overview

As described above, an exemplary data collection device of this invention includes an acquirer configured to acquire the location of a vehicle from a vehicle device mounted on the vehicle; an extractor configured to extract, based on the location of the vehicle, at least one identifier out of the identifiers each assigned to a region on a map that is divided into a plurality of regions; a distributor configured to distribute to the vehicle device at least one information pair that is formed by pairing the extracted identifier with a data collection condition; and a collector configured to collect, from the vehicle device, data gathered by the vehicle device based on the collection condition.

The data collection device according to the above configuration, preferably, the extractor is configured to extract the identifier of the region where the vehicle is located, and the identifiers of a plurality of the regions adjacent to the region where the vehicle is located.

In the data collection device according to the above configuration, the extractor may be configured to change the number of identifiers to be extracted based on predetermined information acquired by the vehicle device.

In the data collection device according to the above configuration, the predetermined information may be the number of times of change of the identifier corresponding to the location of the vehicle within a predetermined time.

In the data collection device according to the above configuration, the distributor may be configured, when the identifiers extracted by the extractor are partly different from the identifiers extracted previously, to distribute to the vehicle device only the information pairs each composed of a newly extracted identifier with a collection condition attached to it.

An exemplary data collection system of this invention includes the data collection device according to the above configuration and the vehicle device.

In the data collection system according to the above configuration, preferably, the vehicle device includes a receiver configured to receive information pair, a calculator configured to calculate the identifier based on information on the location of the vehicle, a determiner configured to determine whether to gather the data based on the calculated identifier and the information pair, and a gatherer configured to gather data.

What is claimed is:

1. A data collection device comprising at least one processor or integrated circuit and a memory, the memory storing instructions to cause the atleast one processor or integrated circuit to function as:
   an acquirer configured to acquire a location of a vehicle from a vehicle device mounted on the vehicle;
   an extractor configured to extract, based on the location of the vehicle, at least one identifier out of identifiers each assigned to a region on a map that is divided into a pluralityof regions;
   a distributor configured to distribute to the vehicle device at least one information pair that is formed by pairing the extracted identifier with a data collection condition, wherein,when the extracted identifier is paired with a data collection condition that is empty, the distributor is configured to distribute to the vehicle device at least one information pair that is formed by pairing the extracted identifier with an empty collection condition; and
   a collector configured to collect, from the vehicle device, data gathered by the vehicle device based on the collection condition,
   wherein the distributor is configured to:
      determine whether the identifiers extracted by the extractor are partly different from identifiers extracted previously; and
      when the distributor determines that the identifiers extracted by the extractor are partly different from the identifiers extracted previously, distribute, to the vehicle device, only information pairs each composed of a newly extracted identifier with a collection condition attached thereto.

2. The data collection device according to claim 1, whereinthe extractor is configured to extract
   the identifier of the region where the vehicle is located, and
   identifiers of a plurality of the regions adjacent to the region where the vehicle is located.

3. The data collection device according to claim 1, wherein the extractor is configured to change the number of identifiers to be extracted based on predetermined information acquired by the vehicle device.

4. The data collection device according to claim 3, wherein the predetermined information is number of times of change of the identifier corresponding to the location of the vehicle within a predetermined time.

5. A data collection system comprising:
the data collection device according to claim 1; and
the vehicle device.

6. The data collection system according to claim 5, wherein
the vehicle device includes at least one processor or integrated circuit and a memory, the memory storing instructions to cause the at least one processor or integrated circuit to function as
a receiver configured to receive the information pair,
a calculator configured to calculate the identifier based on information on the location of the vehicle,
a determiner configured to determine whether to gather the data based on the calculated identifier and the information pair, and a gatherer configured to gather the data.

7. A vehicle device which, in response to commands froma data collection device arranged outside a vehicle, gathers data and transmits the data to the data collection device, the vehicle device comprising at least one processor or integrated circuit and a memory, the memory storing instructions to cause the at least one processor or integrated circuit to function as:
a receiver configured to receive information pairs each formed by pairing an identifier, which is extracted out of identifiers each assigned to a region on a map that is divided into a plurality of regions, with a data collection condition, wherein, when the extracted identifier is paired with a data collection condition that is empty, the receiver is configured to receive at least one information pair that is formed by pairing the extracted identifier with an empty collection condition;
a calculator configured to calculate the identifier based on information on the location of the vehicle; and
a determiner configured to determine whether to gather the data based on thecalculated identifier and the information pair, wherein the receiver is configured to receive the information pairs from a distributor configured to determine whether the identifiers extracted by an extractor are partly different from identifiers extracted previously, and
wherein when the distributor determines that the identifiers extracted by the extractor are partly different from the identifiers extracted previously, the receiver receives, from the distributor, only information pairs each composed of a newly extracted identifier with a collection condition attached thereto.

8. A data collection method comprising:
acquiring a location of a vehicle from a vehicle device mounted on the vehicle;
extracting, based on the location of the vehicle, at least one identifier out of identifiers each assigned to a region on a map that is divided into a plurality of regions;
distributing to the vehicle device at least one information pair that is formed by pairing the extracted identifier with a data collection condition, wherein, when the extracted identifier is paired with a data collection condition that is empty, the distributing distributes to the vehicle device at least one information pair that is formed by pairing the extracted identifier with an empty collection condition; and
collecting, from the vehicle device, data gathered by the vehicle device based on thecollection condition,
wherein the distributing includes:
determining whether the identifiers extracted by an extractor are partly different from identifiers extracted previously; and
when it is determined that the identifiers extracted by the extractor are partly different from the identifiers extracted previously, distributing, to the vehicle device, only information pairs each composed of a newly extracted identifier with a collection condition attached thereto.

* * * * *